(12) United States Patent
Komiyama

(10) Patent No.: US 12,273,625 B2
(45) Date of Patent: Apr. 8, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Mai Komiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 18/060,212

(22) Filed: Nov. 30, 2022

(65) Prior Publication Data

US 2023/0171501 A1    Jun. 1, 2023

(30) Foreign Application Priority Data

Dec. 1, 2021    (JP) .................................. 2021-195614

(51) Int. Cl.
*H04N 23/695* (2023.01)
*H04N 23/61* (2023.01)
*H04N 23/90* (2023.01)

(52) U.S. Cl.
CPC ........... *H04N 23/695* (2023.01); *H04N 23/61* (2023.01); *H04N 23/90* (2023.01)

(58) Field of Classification Search
None
See application file for complete search history.

(56) References Cited

U.S. PATENT DOCUMENTS

| | | | | |
|---|---|---|---|---|
| 2013/0278774 A1* | 10/2013 | Fujimatsu | ............... | H04N 7/185 348/159 |
| 2020/0228692 A1* | 7/2020 | Wakamatsu | ....... | H04N 23/6812 |
| 2021/0152731 A1 | 5/2021 | Wakamatsu | | |

FOREIGN PATENT DOCUMENTS

| | | |
|---|---|---|
| JP | 2015050696 A | 3/2015 |
| JP | 2020025248 A | 2/2020 |

* cited by examiner

*Primary Examiner* — Christopher Braniff
(74) *Attorney, Agent, or Firm* — Canon U.S.A., Inc. IP Division

(57) ABSTRACT

An information processing apparatus includes a computer executing instructions which, when executed by the computer, cause the information processing apparatus to: detect, from among a plurality of image capturing apparatuses, a first image capturing apparatus a state of which is changed from (a) automatic image capturing in which the first image capturing apparatus automatically tracks and captures a first object to (b) manual image capturing in which the first image capturing apparatus captures a second object different from the first object based on an instruction from a user, and cause a second image capturing apparatus from among the image capturing apparatuses other than the first image capturing apparatus to perform the automatic image capturing in which the second image capturing apparatus automatically tracks and captures the first object, in a case where the first image capturing apparatus is detected.

10 Claims, 7 Drawing Sheets

INFORMATION PROCESSING APPARATUS, INFORMATION PROCESSING METHOD, AND STORAGE MEDIUM

BACKGROUND

Field of the Disclosure

The present disclosure relates to an information processing apparatus, an information processing method, and a storage medium.

Description of the Related Art

In recent years, an image capturing system that remotely operates a camera via a network to capture a moving image has become popular. Remote operation of a camera can be implemented by a hardware controller, such as a joystick and an application operating on a personal computer (PC) or a mobile terminal. For example, a user who operates a camera can issue an instruction to the camera to execute pan-tilt-zoom (PTZ) operation while checking an image captured by the camera.

Further, for the purpose of manpower saving, there is an increased demand for an automatic image capturing system in which a plurality of cameras each having an automatic image capturing function executes image capturing in cooperation with each other. In such an automatic image capturing system, each of the cameras executes automatic image capturing to automatically track and capture a specified object with predetermined imaging composition.

In the above-described automatic image capturing system, there is a case where a photographer wishes to manually capture an object which cannot favorably be captured by the automatic image capturing, or a case where a photographer wishes to perform image capturing that cannot be implemented by the automatic image capturing in a way intended by the photographer depending on the setting where the object is situated. That is, there may be a case where a manual image capturing operation and an automatic image capturing operation are executed simultaneously.

Japanese Patent Application Laid-Open No. 2020-25248 discusses a technique for transmitting object information of a manual image capturing camera to an automatic image capturing camera and automatically tracking an object identical to the object captured by the manual image capturing camera by the automatic image capturing camera to support the image capturing executed by the manual image capturing camera.

According to the technique discussed in Japanese Patent Application Laid-Open No. 2020-25248, since the automatic image capturing camera different from the manual image capturing camera tracks the same object as the one captured by the manual image capturing camera, missing of the object captured by the manual image capturing camera can be prevented. However, in a case where the image capturing operation of the automatic image capturing camera is changed to manual image capturing operation and a photographer freely operates the camera, the entire image capturing system is brought into a state where an object originally specified as an automatic image capturing target cannot be captured thereby.

SUMMARY

According to an aspect of the present disclosure, an information processing apparatus includes a computer executing instructions which, when executed by the computer, cause the information processing apparatus to: detect, from among a plurality of image capturing apparatuses, a first image capturing apparatus a state of which is changed from (a) automatic image capturing in which the first image capturing apparatus automatically tracks and captures a first object to (b) manual image capturing in which the first image capturing apparatus captures a second object different from the first object based on an instruction from a user, and cause a second image capturing apparatus from among the image capturing apparatuses other than the first image capturing apparatus to perform the automatic image capturing in which the second image capturing apparats automatically tracks and captures the first object, in a case where the first image capturing apparatus is detected.

Further features of various embodiments will become apparent from the following description of exemplary embodiments with reference to the attached drawings.

DESCRIPTION OF THE EMBODIMENTS

Hereinafter, exemplary embodiments embodying the present disclosure will be described in detail with reference to the appended drawings.

The exemplary embodiments described below are merely examples for implementing the present disclosure, and are to be modified or changed as appropriate depending on a configuration and various conditions of an apparatus to which the present disclosure is applied. Therefore, some embodiments are not limited to the exemplary embodiments described below.

[System Configuration]

Figure 1:
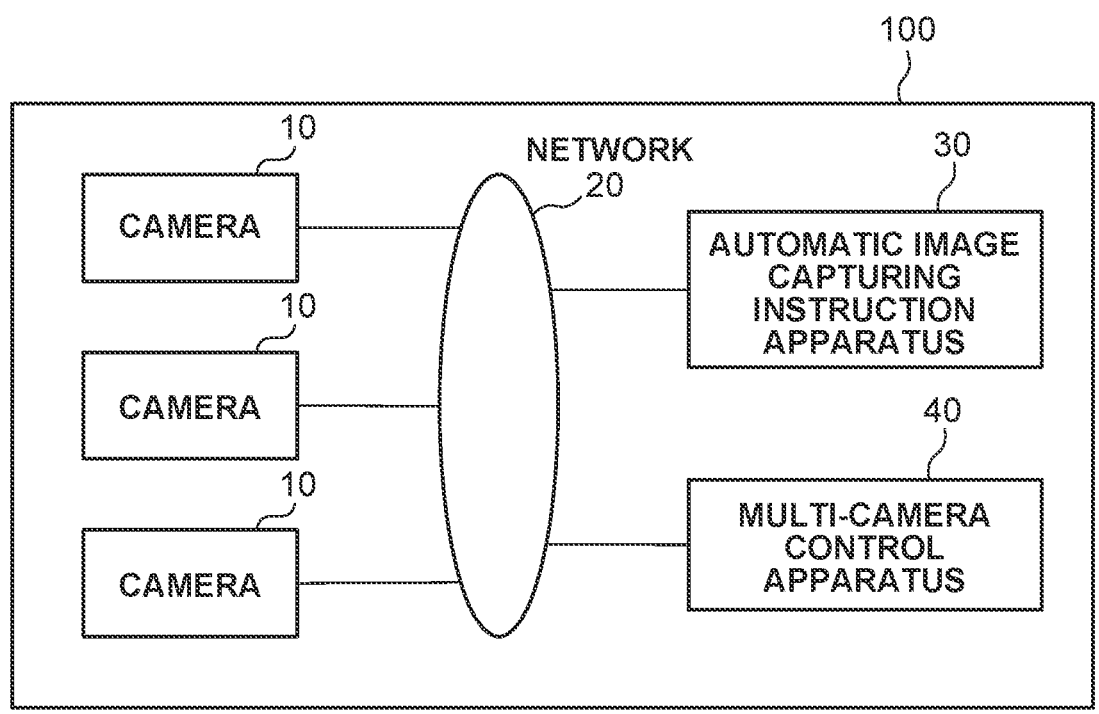
FIG. 1 is a block diagram illustrating a configuration example of an image capturing system according to an exemplary embodiment.

FIG. 1 is a block diagram illustrating an example of an overall configuration of an image capturing system 100 according to a first exemplary embodiment.

As illustrated in FIG. 1, the image capturing system 100 includes a plurality of network cameras (hereinafter, simply called "cameras") 10, a network 20, an automatic image capturing instruction apparatus 30, and a multi-camera control apparatus 40. The plurality of cameras 10, the automatic image capturing instruction apparatus 30, and the multi-camera control apparatus 40 are connected to each other via the network 20.

Figure 2:
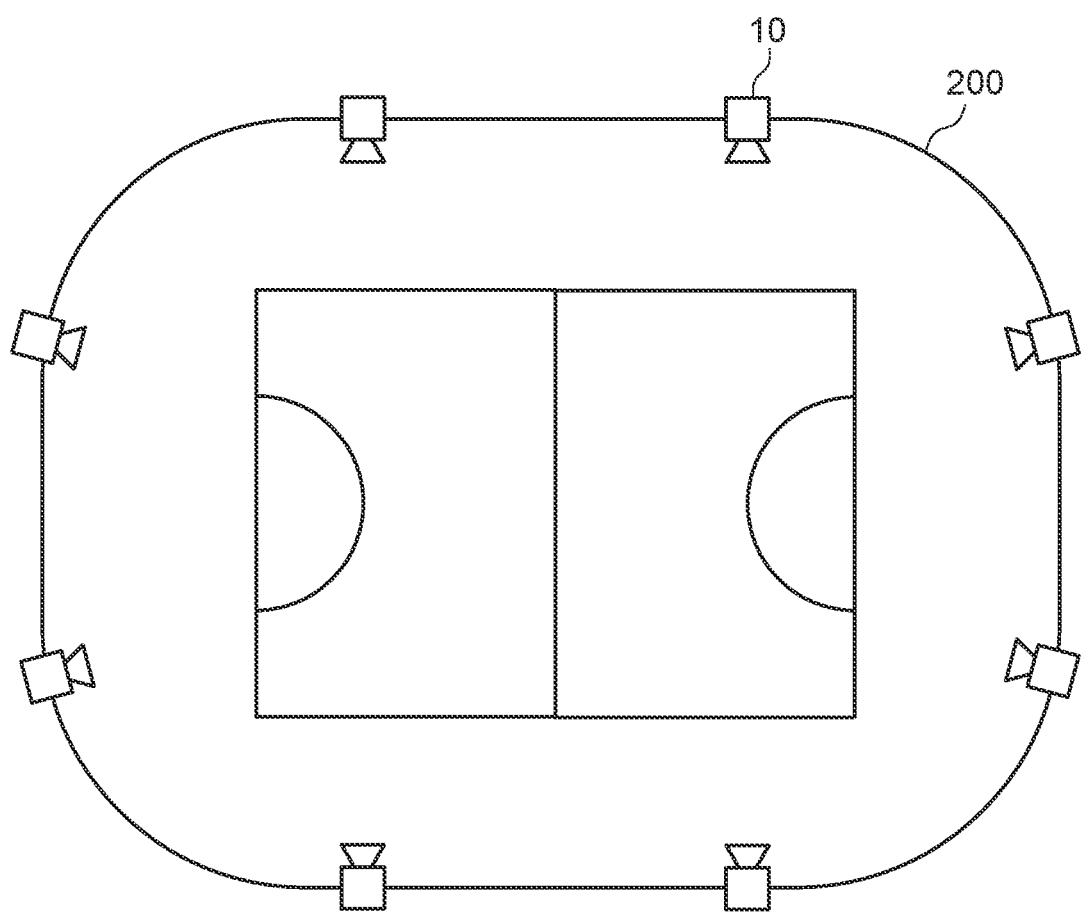
FIG. 2 is a diagram illustrating an example of an arrangement of cameras.

As illustrated in FIG. 2, the cameras 10 are arranged at different positions to surround an image capturing area 200, and the cameras 10 capture respective predetermined areas within the image capturing area 200. The present exemplary embodiment will be described using an example where the image capturing area 200 is a soccer pitch and the plurality of cameras 10 captures images of a soccer game. However, the image capturing area 200 is not limited to the soccer pitch, and the image capturing area 200 can be, for example, any other athletic field where a sports game other than a soccer game is taken place, a stage where acting performance is held, or a film studio.

Each of the cameras 10 is an image capturing apparatus having an automatic image capturing function for automatically capturing a specific object in accordance with an automatic image capturing method determined based on a predetermined automatic image capturing policy. Based on an instruction (automatic image capturing instruction) on an automatic image capturing method issued by the automatic image capturing instruction apparatus 30, each of the cameras 10 executes pan-tilt-zoom (PTZ) control depending on the movement of the object to automatically track and capture images of the object. Herein, the automatic image capturing method includes information about an object specified as an image capturing target to be tracked and captured and includes information about imaging composition of the object specified as the image capturing target.

For example, each of the cameras 10 identifies an object specified as an image capturing target by identifying the number on a player's uniform or by recognizing the face of a player, and each of the cameras 10 executes PTZ control such that the object is constantly captured in the same size (e.g., a bust-up shot) at the same position within the image (e.g., the center of the image).

Further, in each of the cameras 10, the automatic image capturing function can be switched between an enabled state and a disabled state in response to an instruction from the user. Each of the cameras 10 can remotely be controlled by the multi-camera control apparatus 40 via the network 20. In a state where the automatic image capturing function of the camera 10 is disabled, the camera 10 can manually capture an image of an object in accordance with an instruction from the user.

In the description below, a camera 10 with the automatic image capturing function enabled is called an "automatic image capturing camera", and a camera 10 with the automatic image capturing function disabled, which is remotely controlled by the user, is called a "manual image capturing camera".

Further, each of the cameras 10 can transmit captured image data and image capturing information in response to a request from the automatic image capturing instruction apparatus 30 and a request from the multi-camera control apparatus 40. Herein, the image capturing information includes information about the object as a current image capturing target of the camera 10 and information about the imaging composition of the object.

Although the present exemplary embodiment will be described based on a case where each of the cameras 10 has an automatic image capturing function, an automatic image capturing apparatus that detects an object from a captured image and issues a PTZ control instruction may externally be mounted on each of the cameras 10.

Further, in addition to the plurality of cameras 10 each implementing the automatic image capturing function under PTZ control, the image capturing system 100 may include one or more fixed cameras as bird's eye view cameras for constantly capturing all or part of the image capturing area 200. In this case, the automatic image capturing instruction apparatus 30 can grasp the situation in the image capturing area 200 based on the captured image data acquired by the bird's eye view cameras and issue an automatic image capturing instruction to each of the cameras 10 that execute automatic image capturing.

For example, the network 20 can be implemented by using a plurality of routers, switches, and cables that are compliant with a communication standard, such as Ethernet®. The network 20 can also be configured by using the internet, a wired local area network (LAN), a wireless LAN, or a combination of these.

The communication standard, the scale, and the configuration of the network 20 are not specifically limited as long as the network 20 is configured such that the camera 10, the automatic image capturing instruction apparatus 30, and the multi-camera control apparatus 40 can communicate with each other via the network 20.

For example, the automatic image capturing instruction apparatus 30 is configured by a personal computer (PC) and a server apparatus, and includes an image analysis function and an image capturing determination function. For example, the automatic image capturing instruction apparatus 30 can analyze a soccer game by analyzing the images captured by a camera operated as the bird's eye view camera among the plurality of cameras 10 and detecting the positions and movement of players. Then, based on the analysis result, the automatic image capturing instruction apparatus 30 determines how the image capturing area 200 is to be imaged, determines an automatic image capturing method of a camera operated as an automatic image capturing camera from among the plurality of cameras 10, and issues an automatic image capturing instruction thereto.

Herein, the automatic image capturing instruction issued to each of the cameras 10 can include an instruction about an object specified as an image capturing target. For example, in a situation where a goal is about to be scored in a soccer game, the automatic image capturing instruction can include an instruction for causing each of the cameras 10 to track a different object, i.e., a specific player, near the goalpost.

Further, the automatic image capturing instruction issued to each of the cameras 10 may include an instruction on imaging composition, such as the position and the size of the object in an image capturing range (captured image). For example, the automatic image capturing instruction can include an instruction for capturing a close-up shot, a bust-up shot, or a full-body shot of an object at the center of an image.

Further, in a case where the object is determined as an important object such a player who is holding a ball, the automatic image capturing instruction may include an instruction for causing the plurality of cameras 10 to capture the important object. In addition, the content of the automatic image capturing instruction is not limited to the above.

In a case where an object as an automatic image capturing target of any one of the plurality of cameras 10 is changed to another object after the camera 10 is shifted to a manual image capturing state from an automatic image capturing state, the automatic image capturing instruction apparatus 30 can detect the change of the object. Then, the automatic image capturing instruction apparatus 30 determines an automatic image capturing method of any one of the other automatic image capturing cameras 10, and issues an automatic image capturing instruction to cause the one of the other automatic image capturing cameras 10 to capture the object which cannot be captured by the manual image capturing camera.

In other words, the automatic image capturing instruction apparatus 30 detects an image capturing apparatus of which the object as an automatic image capturing target is changed to another object after the automatic image capturing function thereof is disabled, and determines an automatic image capturing method to cause another image capturing apparatus different from that image capturing apparatus to automatically capture the changed object.

The multi-camera control apparatus 40 can be configured by a PC or a tablet terminal.

The multi-camera control apparatus 40 is a client terminal including a display unit configured by a display and an operation unit, such as a mouse, a keyboard, a touch panel, or a joystick, capable of accepting a user operation.

The multi-camera control apparatus 40 executes display control to display images captured by the plurality of cameras 10 on the display unit, and the multi-camera control apparatus 40 accepts an operation that the user has issued using the operation unit while checking the captured images displayed on the display unit. Then, in accordance with the operation issued by the user, the multi-camera control apparatus 40 remotely executes PTZ control on a selected camera 10. In some embodiments, it is preferable that a joystick be used for PTZ control in order to implement a smooth PTZ operation. However, the PTZ control can also be performed through a graphical user interface (GUI) on an application.

Further, in response to a request from the automatic image capturing instruction apparatus 30, the multi-camera control apparatus 40 can transmit camera operation information on the plurality of cameras 10. Herein, the camera operation information may include camera information for specifying a camera 10 selected as a manual image capturing camera.

The camera operation information may also include information about a PTZ operation performed on the camera 10 by the user and information about setting operations, such as an image quality adjustment operation and a setting change operation.

Further, a configuration of the image capturing system 100 is not limited to the configuration illustrated in FIG. 1. For example, the number of cameras 10 connected to the network 20 is not limited to the number of cameras 10 illustrated in FIG. 1 as long as at least two cameras 10 are connected to the network 20. Further, a plurality of multi-camera control apparatuses 40 may be connected to the network 20. Furthermore, the automatic image capturing instruction apparatus 30 and the multi-camera control apparatus 40 need not be physically independent from one another, and can be configured as a single apparatus, such as a PC.

[Hardware Configuration]

Next, a hardware configuration of each of the apparatuses according to the present exemplary embodiment will be described.

Figure 3:
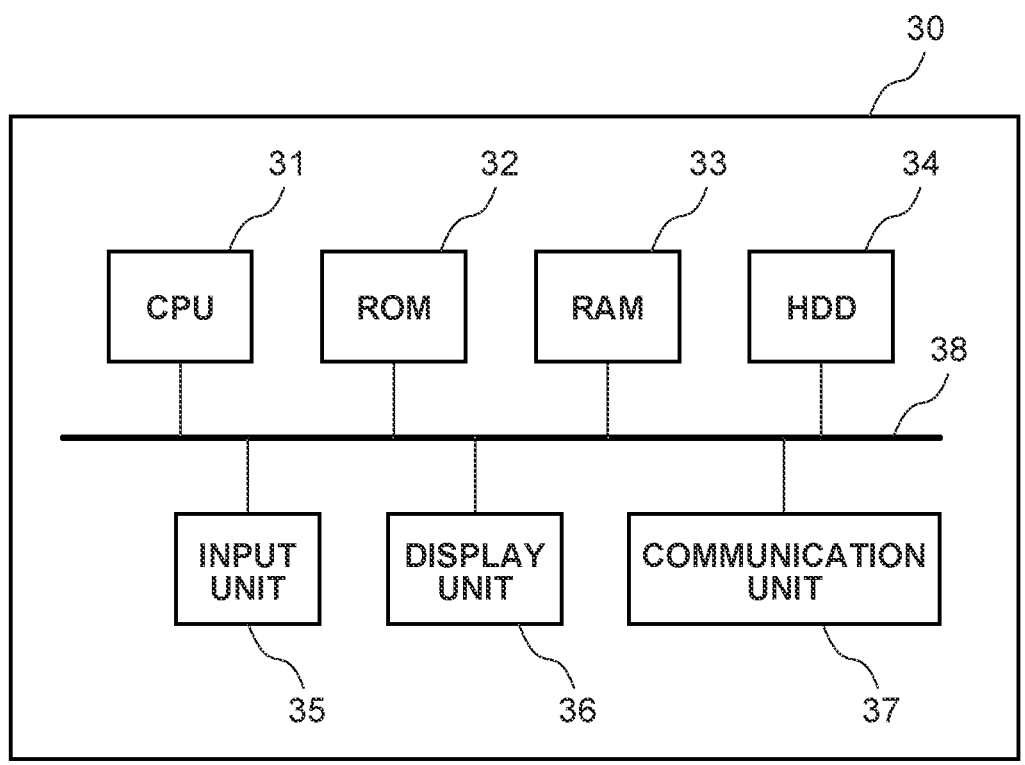
FIG. 3 is a block diagram illustrating an example of a hardware configuration of an automatic image capturing instruction apparatus.

FIG. 3 is a block diagram illustrating an example of a hardware configuration of the automatic image capturing instruction apparatus 30 according to the present exemplary embodiment. The automatic image capturing instruction apparatus 30 includes a central processing unit (CPU) 31, a read only memory (ROM) 32, a random access memory (RAM) 33, a hard disk drive (HDD) 34, an input unit 35, a display unit 36, and a communication unit 37. The automatic image capturing instruction apparatus 30 may also include components other than the above described components.

The CPU 31 generally controls the operations executed by the automatic image capturing instruction apparatus 30. The ROM 32 includes a storage area for storing a program and data necessary for the CPU 31 to execute processing. In addition, the foregoing program may be stored in the HDD 34 or a removable storage medium (not illustrated). The RAM 33 functions as a main memory and a work area of the CPU 31. When the CPU 31 executes processing, the CPU 31 loads a necessary program on the RAM 33 from the ROM 32, and executes the program to implement various functional operations.

The HDD 34 can be used not only as a permanent storage area of an operating system (OS), various programs, and various types of data, but also as a temporary storage area of various types of data.

Further, another auxiliary storage device such as a solid state drive (SSD) can also be used instead of the HDD 34.

The input unit 35 includes operation units, such as a keyboard, a mouse, a joystick, and a touch panel. The input unit 35 accepts the operations performed on the operation units by the user and inputs various instructions to the CPU 31. The display unit 36 includes a monitor such as a liquid crystal display (LCD), and displays a GUI for allowing the user to operate the automatic image capturing instruction apparatus 30. The CPU 31 can operate as a display control unit that controls the display unit 36. The communication unit 37 transmits and receives data to/from external apparatuses, such as the cameras 10 and the multi-camera control apparatus 40 via the network 20.

Although the present exemplary embodiment will be described based on a case where the automatic image capturing instruction apparatus 30 includes the input unit 35 and the display unit 36, at least any one of the input unit 35 and the display unit 36 may be provided as an independent apparatus separately existing on the outside of the automatic image capturing instruction apparatus 30.

All or part of the functions of the automatic image capturing instruction apparatus 30 is implemented by the CPU 31 executing a program stored in the ROM 32 or the HDD 34. However, at least part of the functions of the automatic image capturing instruction apparatus 30 may be operated as dedicated hardware. In this case, the dedicated hardware is operated based on the control executed by the CPU 31.

In addition, the multi-camera control apparatus 40 can include a hardware configuration similar to that of the automatic image capturing instruction apparatus 30.

Further, the hardware configuration illustrated in FIG. 3 is also applicable to the hardware configuration of the camera 10. However, in this case, the camera 10 includes an image capturing unit instead of the display unit 36. Herein, the image capturing unit captures an image of an object and generates a captured image. For example, the image capturing unit can includes an image sensor, such as a complementary metal oxide semiconductor (CMOS) sensor or a charge coupled device (CCD) sensor; an analog/digital (A/D) conversion unit; and a development processing unit. Further, the input unit 35 in the camera 10 includes a power button and a setting button, so that an operator who operates the camera 10 can input an instruction to the camera 10 via the input unit 35.

Then, all or part of the functions of the camera 10 are implement by a CPU of the camera 10 corresponding to the CPU 31 when the CPU executes a program. However, at least part of the functions of the camera 10 may be operated as dedicated hardware. In this case, the dedicated hardware is operated based on the control executed by the CPU.

The present exemplary embodiment will be described based on a case where the automatic image capturing instruction apparatus 30 functions as an information processing apparatus that determines the automatic image capturing methods of the plurality of cameras 10 each having an automatic image capturing function. However, the multi-camera control apparatus 40, a general PC communicably connected to the cameras 10, or one of the plurality of cameras 10 may be operated as the foregoing information processing apparatus.

[Functional Configuration]

Figure 4:
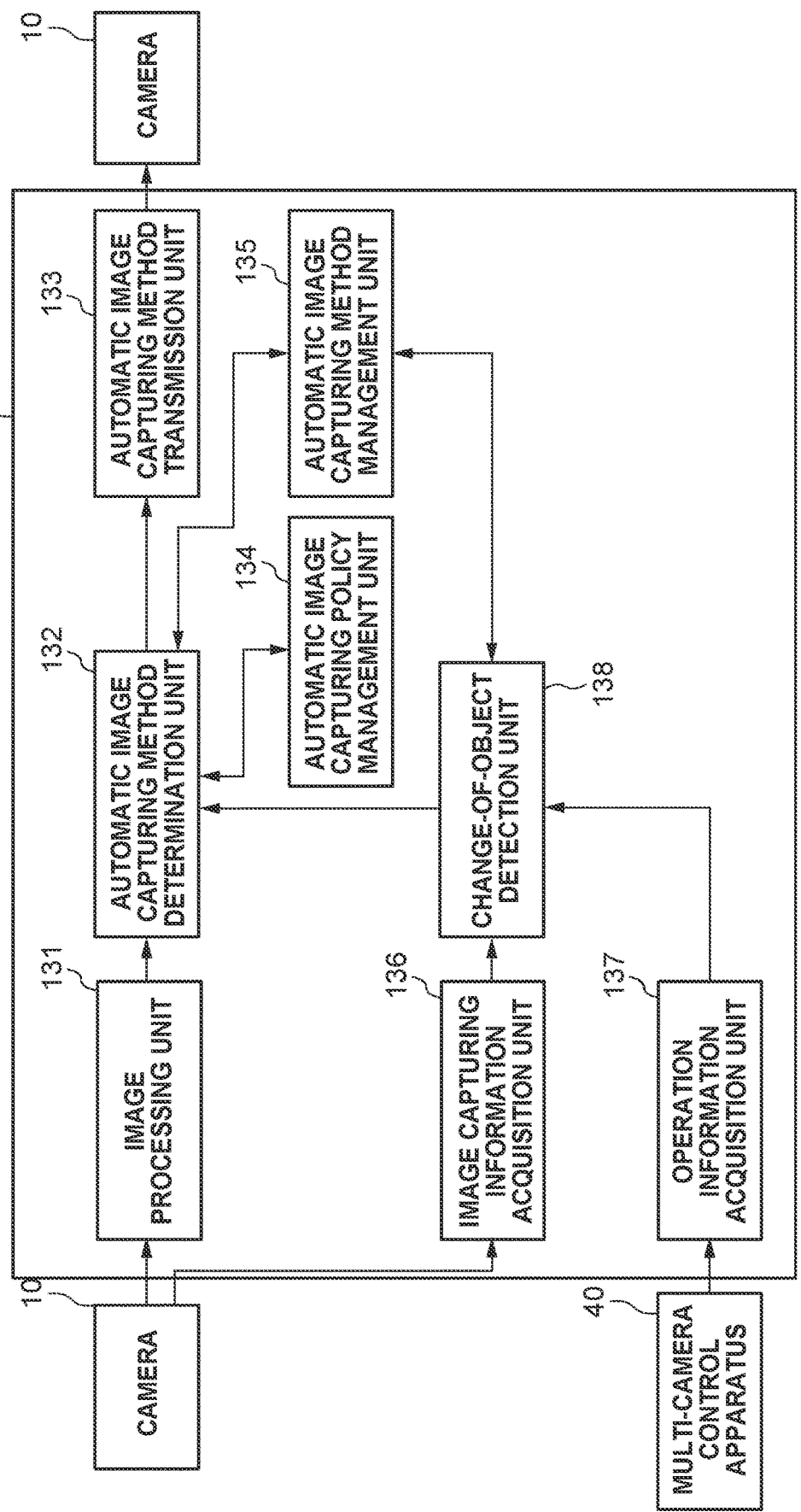
FIG. 4 is a block diagram illustrating an example of a functional configuration of the automatic image capturing instruction apparatus.

FIG. 4 is a block diagram illustrating an example of a functional configuration of the automatic image capturing instruction apparatus 30.

The automatic image capturing instruction apparatus 30 includes an image processing unit 131, an automatic image capturing method determination unit 132, an automatic image capturing method transmission unit 133, an automatic image capturing policy management unit 134, and an automatic image capturing method management unit 135. The automatic image capturing instruction apparatus 30 further includes an image capturing information acquisition unit 136, an operation information acquisition unit 137, and a change-of-object detection unit 138.

Each of the constituent elements illustrated in FIG. 4 is implemented by the CPU 31 of the automatic image capturing instruction apparatus 30 when the CPU 31 executes a corresponding processing program. However, at least part of the functions of the constituent elements illustrated in FIG. 4 may be implemented by dedicated hardware. In this case, the dedicated hardware is operated based on the control executed by the CPU 31.

Although the present exemplary embodiment will be described based on a case where the automatic image capturing instruction apparatus 30 includes the functions illustrated in FIG. 4, part of the functions may be included in another device.

The image processing unit 131 executes image processing on captured image data received from the cameras 10, and the image processing unit 131 transmits the captured image data on which the image processing has been performed to the automatic image capturing method determination unit 132.

The automatic image capturing method determination unit 132 analyzes the image data received from the image processing unit 131 and determines an image capturing method of each of the automatic image capturing cameras 10 based on the automatic image capturing policy managed by the automatic image capturing policy management unit 134. The automatic image capturing method determination unit 132 determines the automatic image capturing method of each of the automatic image capturing cameras 10 and transmits the automatic image capturing methods to the automatic image capturing method transmission unit 133 and the automatic image capturing method management unit 135.

The automatic image capturing method determination unit 132 may determine the automatic image capturing method by using only images captured by the bird's eye view camera from among the images captured by the plurality of cameras 10 acquired by the image processing unit 131, or automatic image capturing method determination unit 132 may determine the automatic image capturing method by using the images captured by all or part of the automatic image capturing cameras 10. Further, in a case where cameras having different characteristics exist in the plurality of cameras 10, the automatic image capturing method determination unit 132 may determine the automatic image capturing method with consideration for the arrangement and the characteristics of the cameras 10.

The automatic image capturing method of each automatic image capturing camera 10 may be determined by using information acquired through learning using artificial intelligence (AI) or may be determined based on a preset determination method.

Further, in a case where the automatic image capturing method determination unit 132 is notified of change of an object that is caused by switching of automatic image capturing to manual image capturing, from the change-of-object detection unit 138, the automatic image capturing method determination unit 132 can newly determine the automatic image capturing method.

In addition, the automatic image capturing method determination unit 132 may newly determine the automatic image capturing method as appropriate depending not only on the notification from the change-of-object detection unit 138, but also on the movement of the object existing in the image capturing area 200 and development of a game in a case where a sporting event is being captured thereby. Further, the automatic image capturing method determination unit 132 may monitor the state of automatic image capturing (e.g., whether automatic image capturing is executed in accordance with the instruction) and may newly determine the automatic image capturing method when the automatic image capturing method determination unit 132 determines that automatic image capturing is not executed appropriately. Furthermore, in a case where the automatic image capturing method is to be changed, the change may be made with respect to all of the automatic image capturing cameras 10, or the change may be made with respect to only part of the automatic image capturing cameras 10.

The automatic image capturing method transmission unit 133 receives the automatic image capturing methods from the automatic image capturing method determination unit 132, and the automatic image capturing method transmission unit 133 transmits the automatic image capturing instruction to each of the cameras 10 that executes automatic image capturing. At this time, the automatic image capturing instruction to be transmitted may include information about an object tracked and captured by each of the cameras 10 and information about the imaging composition. Herein, the object information includes information from which each of the cameras 10 can identify the object (e.g., an object name, an object number, and information about a current position). Further, the imaging composition includes information that indicates a position and a size of the object in the image capturing range. In addition, the imaging composition may automatically be determined and changed by each of the cameras 10 depending on the movement or the state of the object.

The automatic image capturing policy management unit 134 manages the automatic image capturing policy including a policy and a judgement criterion which the automatic image capturing method determination unit 132 follows when the automatic image capturing method of each automatic image capturing camera 10 is to be determined. A policy of capturing as many objects as possible and a policy of always capturing an important object by a plurality of cameras are given as the examples of the automatic image capturing policy. The automatic image capturing policy management unit 134 may also manage a degree of importance of each object and a judgement criterion of an important object depending on a scene. Further, the automatic image capturing policy management unit 134 may manage the number of cameras available for executing automatic image capturing or the number of objects that can automatically be captured thereby as the automatic image capturing policy.

The automatic image capturing policy managed by the automatic image capturing policy management unit 134 may be a policy acquired through learning using AI or a policy previously set by the user. Further, the automatic image capturing policy may be a combination of these policies (e.g., a policy which is acquired through learning using AI on which a user setting is reflected).

The automatic image capturing method management unit 135 receives the automatic image capturing methods of the automatic image capturing cameras 10 determined by the automatic image capturing method determination unit 132, and manages the current automatic image capturing methods of the automatic image capturing cameras 10. If necessary, the automatic image capturing method management unit 135 may similarly manage past automatic image capturing methods and object information of the manual image capturing camera 10.

The image capturing information acquisition unit 136 acquires image capturing information including information about the current image capturing target object and the imaging composition from each of the cameras 10, and transmits the acquired image capturing information to the change-of-object detection unit 138.

The present exemplary embodiment will be described based on a case where the image capturing information acquisition unit 136 acquires the image capturing information including object information and imaging composition from each of the cameras 10. However, the image capturing information acquisition unit 136 may acquire the image capturing information including the current image capturing target object information and the imaging composition of each of the cameras 10 by acquiring and analyzing the images captured by the cameras 10.

The operation information acquisition unit 137 acquires camera operation information on each of the cameras 10 from the multi-camera control apparatus 40, and transmits the acquired camera operation information to the change-of-object detection unit 138. As described above, the camera operation information includes camera information for specifying a camera 10 selected as a manual image capturing camera and includes operation information about a PTZ operation and a setting operation performed by the user with respect to that selected camera 10.

Although the present exemplary embodiment will be described based on a case where the operation information acquisition unit 137 acquires the camera operation information on each of the cameras 10 from the multi-camera control apparatus 40, the camera operation information may be acquired via the cameras 10. In this case, the image capturing information acquisition unit 136 may acquire the image capturing information including the camera operation information from each of the cameras 10. In other words, the image capturing information acquisition unit 136 and the operation information acquisition unit 137 can be a single functional unit.

Based on the camera operation information received from the operation information acquisition unit 137, the change-of-object detection unit 138 detects a camera 10 of which the image capturing operation is changed from automatic image capturing to manual image capturing, and the change-of-object detection unit 138 determines whether the object of the camera 10 formerly captured by automatic image capturing is changed to another object.

Specifically, with respect to the automatic image capturing camera 10 of which the image capturing operation is changed from automatic image capturing to manual image capturing, the change-of-object detection unit 138 acquires information about an original object formerly captured by automatic image capturing from the automatic image capturing method management unit 135. Further, with respect to the automatic image capturing camera 10 of which the image capturing operation is changed from automatic image capturing to manual image capturing, the change-of-object detection unit 138 acquires information about an object currently being captured thereby from the image capturing information acquisition unit 136. Then, the change-of-object detection unit 138 detects the change of the object by comparing the information about the original object and the information about the object currently being captured by that camera 10. In a case where the change-of-object detection unit 138 detects the automatic image capturing camera 10 of which the image capturing operation is changed from automatic image capturing to manual image capturing and of which the object is changed, the change-of-object detection unit 138 transmits the former image capturing target object information and the current mage capturing target object information on that camera 10 to the automatic image capturing method determination unit 132.

In order to determine whether the object is changed to another object, the change-of-object detection unit 138 may specify the object originally captured by automatic image capturing as a target object, and the change-of-object detection unit 138 determines that the object is not changed if the target object exists in the image captured by the manual image capturing camera 10. Further the change-of-object detection unit 138 may determine that the object is changed to another object in a case where the target object does not exist in the image captured by the manual image capturing camera 10 for a certain period of time or more, or a main object in the image is not the target object, or a size of the target object in the image is a certain size or smaller. However, a method for determining the change of the object is not limited to the above.

As a method of specifying the changed object, in a case where the same object exists in the image for a certain period of time or more, or a size of the object in the image is a certain size or more, the change-of-object detection unit 138 may specify the object as a current image capturing target object after the change. Further, when a plurality of objects is captured by the camera 10, the change-of-object detection unit 138 may specify an object moving in a similar way as the camera 10 moves, an object existing in a position closest to the center of the image, or an object captured for a longest period of time as a current image capturing target object after the change. Furthermore, a plurality of objects may be specified as current image capturing target objects after the change.

[Flow of Processing]

Next, processing for determining the automatic image capturing method of the camera 10 executed by the automatic image capturing instruction apparatus 30 will be described with reference to FIG. 5. Herein, a description will be given of a flow of processing for determining, based on change of an object due to the change of the image capturing operation of a camera 10 from automatic image capturing to manual image capturing, another camera 10 for which the automatic image capturing method is to be changed, and changing the automatic image capturing method of the camera 10.

Figure 5:
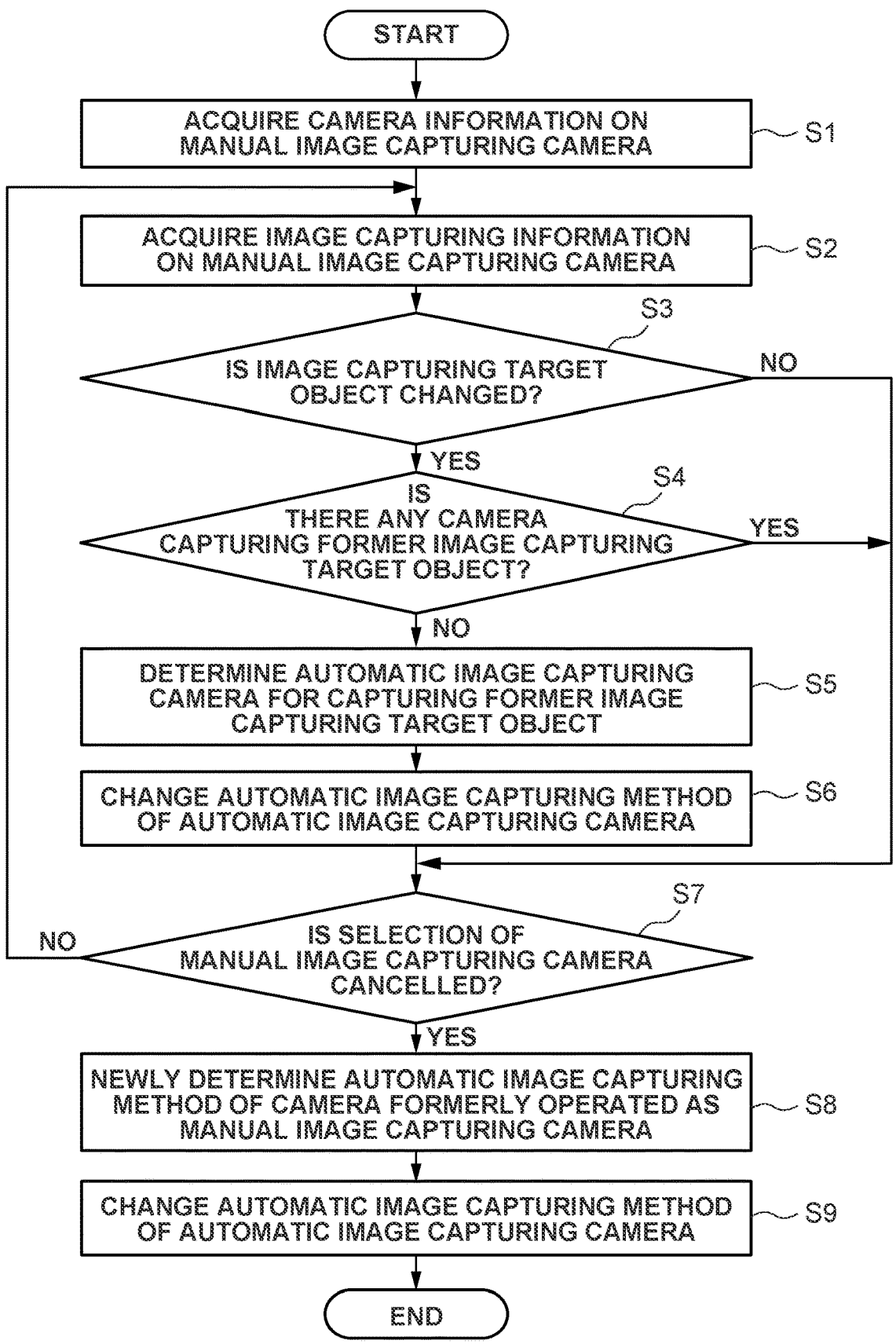
FIG. 5 is a flowchart illustrating an example of processing executed by the automatic image capturing instruction apparatus.

It is assumed that the automatic image capturing method determination unit 132 has already determined the automatic image capturing method when the processing in FIG. 5 is started, and automatic image capturing is executed by all of the cameras 10.

The CPU 31 in FIG. 3 reads and executes a necessary program to cause the automatic image capturing instruction apparatus 30 to implement each process illustrated in FIG. 5.

First, in step S1, the operation information acquisition unit 137 acquires camera operation information on each of the cameras 10 from the multi-camera control apparatus 40. At this time, the operation information acquisition unit 137 can acquire the camera information on the manual image capturing camera 10 which the user has selected by operating the multi-camera control apparatus 40.

In step S2, the image capturing information acquisition unit 136 acquires image capturing information on the manual image capturing camera 10 specified based on the camera information acquired in step S1. This image capturing information includes information about an object currently being captured by the manual image capturing camera 10.

In step S3, with respect to the manual image capturing camera 10 specified based on the camera information acquired in step S1, the change-of-object detection unit 138 determines whether an object originally captured by automatic image capturing is changed to another object. If the change-of-object detection unit 138 determines that the object is changed (YES in step S3), the processing proceeds to step S4. If the change-of-object detection unit 138 determines that the object is not changed (NO in step S3), the processing proceeds to step S7.

In step S4, the automatic image capturing method determination unit 132 acquires the current automatic image capturing methods of the cameras 10 operated as the automatic image capturing cameras from the automatic image capturing method management unit 135, and the automatic image capturing method determination unit 132 determines whether there is an automatic image capturing camera 10 that is capturing the former image capturing target object of the manual image capturing camera 10, i.e., the object formerly captured by the manual image capturing camera 10 before the change of the image capturing operation.

In step S4, if the automatic image capturing method determination unit 132 determines that there is no automatic image capturing camera 10 that is capturing the former image capturing target object of the manual image capturing camera 10 (NO in step S4), the processing proceeds to step S5. In step S5, the automatic image capturing method determination unit 132 determines an automatic image capturing camera 10 for capturing the former image capturing target object of the manual image capturing camera 10. On the other hand, in step S4, if the automatic image capturing method determination unit 132 judges that there is an automatic image capturing camera 10 that is capturing the former image capturing target object of the manual image capturing camera 10 (YES in step S4), the processing proceeds to step S7.

In step S5, the automatic image capturing camera 10 is determined by following the automatic image capturing policy managed by the automatic image capturing policy management unit 134. For example, if the automatic image capturing policy is to capture as many objects as possible, in order to prevent duplication of the same object, the automatic image capturing method determination unit 132 determines an automatic image capturing camera 10 that is capturing an object the same as the current image capturing target object of the manual image capturing camera 10 as the automatic image capturing camera 10 for capturing the former image capturing target object of the manual image capturing camera 10.

Alternatively, in a case where the same object is being captured by a plurality of automatic image capturing cameras 10, an automatic image capturing camera 10 for capturing the former image capturing target object of the manual image capturing camera 10 may be determined from these automatic image capturing cameras 10.

Further, in a case where the automatic image capturing policy is to simultaneously capture a plurality of objects in an image capturing range, a camera 10 that is capturing an object positioned closest to the former image capturing target object of the manual image capturing camera 10 may be determined as the automatic image capturing camera 10 for capturing the former image capturing target object of the manual image capturing camera 10.

Further, based on the arrangement of the cameras 10, a camera 10 arranged at a position closest to the manual image capturing camera 10 may be determined as the automatic image capturing camera 10 for capturing the former image capturing target object of the manual image capturing camera 10. In this case, the determined automatic image capturing camera 10 can capture the former image capturing target object of the manual image capturing camera 10 with the imaging composition similar to the imaging composition of the image captured when the manual image capturing camera 10 is operated as an automatic image capturing camera.

Further, if there is a camera 10 that is not executing automatic image capturing, that camera 10 may be determined as an automatic image capturing camera 10 for capturing the former image capturing target object of the manual image capturing camera 10. Furthermore, based on a degree of importance of an object captured by a camera 10, a camera 10 that is capturing an object of a lowest degree of importance may be determined as an automatic image capturing camera 10 for capturing the former image capturing target object of the manual image capturing camera 10. Further, in a case where a degree of importance of the former image capturing target object of the manual image capturing camera 10 is relatively low, the automatic image capturing method determination unit 132 can determine that the former image capturing target object of the manual image capturing camera 10 need not be captured by another automatic image capturing camera 10 and refrains from determining an automatic image capturing camera 10 for capturing the former image capturing target object Then, in step S6, the automatic image capturing method transmission unit 133 transmits the automatic image capturing method to the camera 10 determined in step S5. The automatic image capturing method of the camera 10 determined in step S5 is thus changed, and the former image capturing target object of the manual image capturing camera 10 is captured as an image capturing target of that camera 10.

In step S7, based on the camera operation information on the camera 10 acquired from the multi-camera control apparatus 40, the automatic image capturing instruction apparatus 30 determines whether the selection of the manual image capturing camera made by the user is cancelled. If the selection of the manual image capturing camera is not cancelled (NO in step S7), the processing returns to step S2.

In other words, the processing in steps S2 to S6 is executed repeatedly until the selection of the manual image capturing camera is cancelled.

On the other hand, if the automatic image capturing instruction apparatus 30 determines that the selection of the manual image capturing camera is cancelled (YES in step S7), the processing proceeds to step S8. In step S8, the automatic image capturing method determination unit 132 newly determines an automatic image capturing method for the camera 10 that has been operated as a manual image capturing camera.

The automatic image capturing method is newly determined in step S8 by following the automatic image capturing policy managed by the automatic image capturing policy management unit 134. For example, if the automatic image capturing policy is to minimize the change of the automatic image capturing method, the automatic image capturing method determination unit 132 determines the automatic image capturing method only for the camera 10 that has been operated as a manual image capturing camera without changing the automatic image capturing methods for the cameras 10 already operated as an automatic image capturing cameras. In this case, the automatic image capturing method determination unit 132 can determine the automatic image capturing method to cause the camera 10 that has been operated as a manual image capturing camera to capture an object which is not captured by the other automatic image capturing cameras 10 or an important object already being captured by another automatic image capturing camera 10 with different imaging composition. Further, in a case where the automatic image capturing method management unit 135 also manages past automatic image capturing methods, the automatic image capturing method determination unit 132 may bring back the automatic image capturing method applied before the camera 10 is selected as the manual image capturing camera. In this case, the automatic image capturing method determination unit 132 may also change the automatic image capturing method of the automatic image capturing camera 10 changed in steps S5 and S6 to the original state.

In a case where the user newly selects another automatic image capturing camera 10 to be operated as a manual image capturing camera, the automatic image capturing instruction apparatus 30 may cause the camera 10 of which the selection as a manual image capturing camera is cancelled to capture the object captured by the camera 10 newly selected as a manual image capturing camera during automatic image capturing.

Then, in step S9, the automatic image capturing method transmission unit 133 transmits the automatic image capturing method determined in step S8 to the corresponding camera 10 to make the camera 10 execute automatic image capturing.

Figure 6:
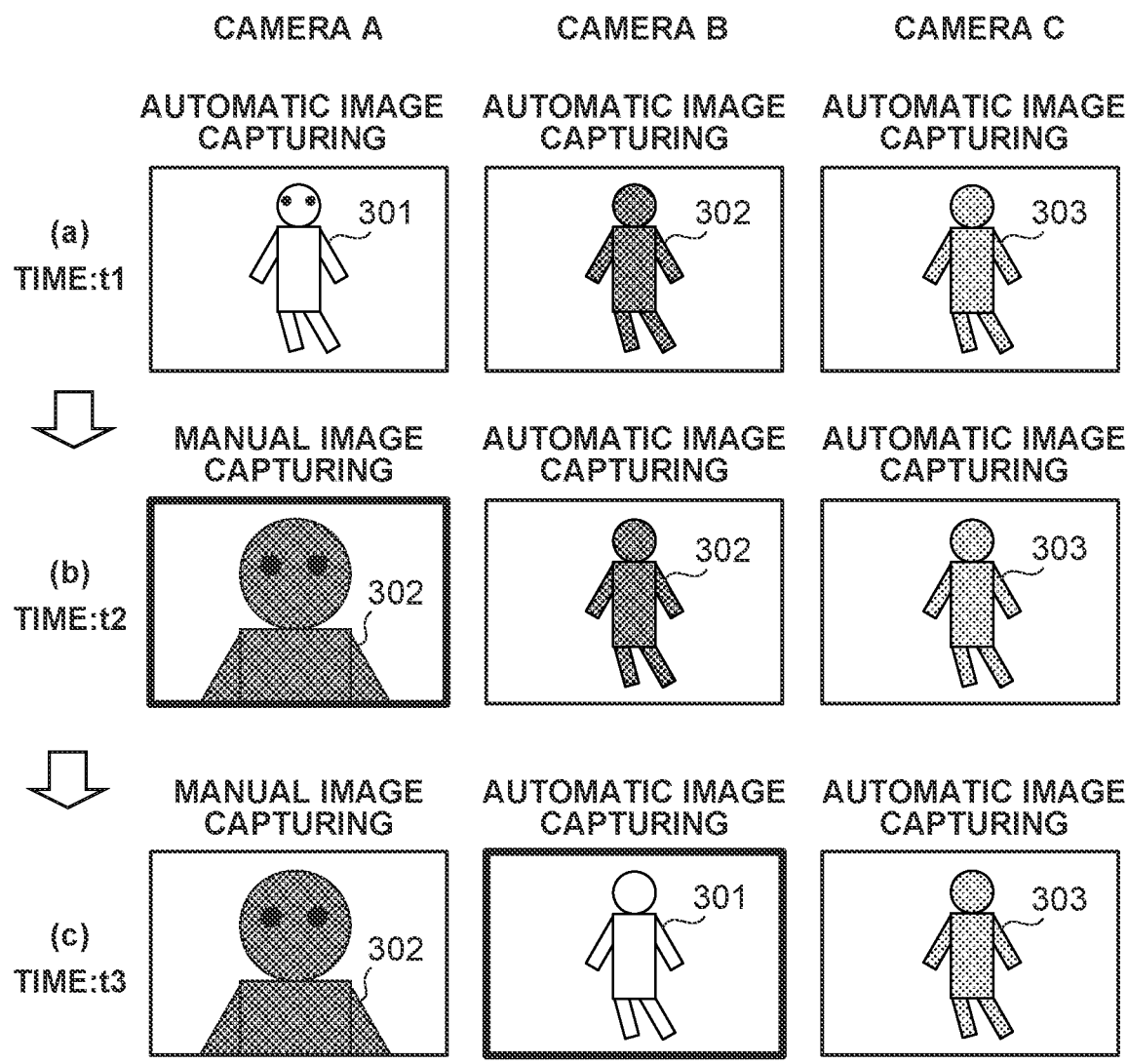
FIG. 6 shows diagrams illustrating an example of change of objects captured by cameras.

FIG. 6 shows diagrams ((a)-(c)) illustrating an example of the change of objects captured by the manual image capturing camera and the automatic image capturing camera.

In FIG. 6, (a) illustrates a state where the processing illustrated in FIG. 5 is started at time t1. Cameras A, B, and C are operated as automatic image capturing cameras and respectively track and capture a person 301, a person 302, and a person 303.

In the foregoing state, the user operates the multi-camera control apparatus 40 to select the camera A as a manual image capturing camera. At time t2 in (b) in FIG. 6, the user switches the camera A arranged right in the direction facing to the face of the person 302 to a manual image capturing camera, and manually captures a close-up image of the face of the person 302 by the camera A. In this state, the object of the camera A is changed to the person 302 from the person 301, so that none of the other automatic image capturing cameras B and C are capturing the person 301, i.e., an object originally captured by the camera A.

In this case, in step S4 in FIG. 5, the automatic image capturing method determination unit 132 determines that there is no automatic image capturing camera that is capturing the former image capturing target object of the manual image capturing camera A. Therefore, in accordance with the image capturing policy managed by the automatic image capturing policy management unit 134, the automatic image capturing method determination unit 132 determines an automatic image capturing camera for capturing the former image capturing target object of the manual image capturing camera A based on the images captured by all or part of the plurality of cameras 10.

At the time t2 in (b) in FIG. 6, both of the manual image capturing camera A and the automatic image capturing camera B are capturing the same person 302. Thus, in a case where the automatic image capturing policy managed by the automatic image capturing policy management unit 134 is to capture as many objects as possible, in step S5 of FIG. 5, the automatic image capturing method determination unit 132 determines the camera B as the automatic image capturing camera for capturing the former image capturing target object of the camera A.

Through the processing, in step S6, the automatic image capturing method of the camera B is changed. As illustrated in (c) in FIG. 6, at time t3, the object of the camera B is changed to the person 301. As described above, in the image capturing system 100 in which both of the manual image capturing camera and the automatic image capturing camera exist, each of the cameras A to C can be prevented from capturing an object already being captured by another camera. Therefore, it is possible to capture as many objects as possible.

As described above, with respect to each of the cameras 10 having an automatic image capturing function for automatically capturing a specific object in accordance with an automatic image capturing method determined based on a predetermined automatic image capturing policy, the automatic image capturing instruction apparatus 30 acquires image capturing information including information about an object as a current image capturing target. Further, based on the acquired image capturing information, from among the plurality of cameras 10, the automatic image capturing instruction apparatus 30 detects a camera 10 of which the automatic image capturing function is disabled and of which the object is changed from a specific object as a first object to another object. Specifically, the automatic image capturing instruction apparatus 30 detects a camera 10 of which the image capturing operation is changed from an automatic image capturing operation, in which a first object is being captured, to a manual image capturing operation by an instruction from the user, and of which the object is thus changed from the first object to a second object, as the first camera 10. Then, in a case where the first camera 10 is detected, the automatic image capturing instruction apparatus 30 determines an image capturing method based on the image capturing policy to cause a second camera 10 other than the first camera 10 to automatically capture the first object as the specific object.

As described above, in a case where an object is changed to the second object from the first object after the automatic image capturing camera is switched to a manual image capturing camera, the automatic image capturing instruction apparatus 30 determines the automatic image capturing method to cause another automatic image capturing camera to automatically capture the first object. With this configuration, an object which cannot be captured by the manual image capturing camera can be followed by the automatic image capturing camera, so that it is possible to execute efficient image capturing in the entire image capturing system 100 in which both of the manual image capturing camera and the automatic image capturing camera exist.

Herein, the second camera 10 for capturing the first object can be determined based on at least one of the image capturing information and the positional information on the plurality of cameras 10.

For example, from among the cameras 10, other than the first camera 10, with the automatic image capturing function enabled, the automatic image capturing instruction apparatus 30 can determine a camera 10 that is capturing the second object as the second camera 10 for capturing the first object. In other words, the automatic image capturing instruction apparatus 30 causes an automatic image capturing camera that is capturing the current image capturing target object of the manual image capturing camera to capture the former image capturing target object of the manual image capturing camera. In this case, each of the cameras 10 can be prevented from capturing an object already being captured by another camera, so that it is possible to capture as many objects as possible in the entire image capturing system.

Further, from among the cameras 10, other than the first camera 10, with the automatic image capturing function enabled, the automatic image capturing instruction apparatus 30 may determine a camera 10 that is capturing an object positioned closest to the first object as the second camera 10 for capturing the first object. In this case, the second camera 10 can simultaneously capture the object specified as the automatic image capturing target and an object formerly specified as an image capturing target of the first camera 10. In this case, the second camera 10 can simultaneously capture the object as an automatic image capturing target and the former image capturing target object of the first camera 10.

Further, from among the cameras 10, other than the first camera 10, with the automatic image capturing function enabled, the automatic image capturing instruction apparatus 30 may determine any one of the cameras 10 that are capturing the same object as the second camera 10 for capturing the first object. In this case, it is possible to prevent a situation where an object is not captured by any of the cameras 10.

Furthermore, from among the cameras 10, other than the first camera 10, with the automatic image capturing function enabled, the automatic image capturing instruction apparatus 30 may determine a camera 10 arranged at a position closest to the first camera 10 as the second camera 10 for capturing the first object. In this case, the second camera 10 can capture the first object with the imaging composition similar to the imaging composition of the first camera 10.

Further, from among the cameras 10, other than the first camera 10, with the automatic image capturing function enabled, the automatic image capturing instruction apparatus 30 may determine a camera 10 that is capturing an object of a lowest degree of importance as the second camera 10 for capturing the first object. In this case, an object of a high degree of importance can be captured preferentially in the entire image capturing system.

Furthermore, the automatic image capturing instruction apparatus 30 may determine at least one of the cameras 10, other than the first camera 10, with the automatic image capturing function disabled as the second camera 10 for capturing the first object. In this case, the automatic image capturing methods of the cameras 10 that are executing automatic image capturing can be prevented from being changed.

In addition, the automatic image capturing instruction apparatus 30 may determine whether it is necessary to cause a camera 10 other than the first camera 10 to capture the first object depending on a degree of importance of the first object. Then, in a case where the automatic image capturing instruction apparatus 30 determines that it is not necessary to capture the first object, the automatic image capturing instruction apparatus 30 may determine not to change the automatic image capturing methods of the cameras 10 other than the first camera 10 with the automatic image capturing function enabled. In this case, it is possible to prevent unnecessary change of the automatic image capturing methods of the cameras 10 that are executing automatic image capturing.

Further, in the above-described exemplary embodiment, in a case where an object of a manual image capturing camera 10 is changed to another object, the automatic image capturing instruction apparatus 30 may similarly determine whether an object originally captured by the camera 10 at the time the automatic image capturing is changed to another object, and the automatic image capturing method determination unit 132 may newly determine the automatic image capturing method if change of the object is detected. Further, even in a case where the former image capturing target object of the manual image capturing camera 10 is not the object originally captured by the camera 10 at the time of automatic image capturing, the automatic image capturing instruction apparatus 30 may cause another automatic image capturing camera to follow the object as an important object manually captured by the user.

Further, with respect to the automatic image capturing camera 10 that is capturing an object identical to the current image capturing target object of the manual image capturing camera 10, the automatic image capturing method determination unit 132 may determine the automatic image capturing method to make the imaging composition of the automatic image capturing camera 10 different from the imaging composition of the manual image capturing camera 10. In this case, if manual image capturing is executed with imaging composition of a close-up of the face, automatic image capturing is executed with imaging composition of a full-body shot, so that the object can be captured with different imaging compositions.

Further, the automatic image capturing instruction apparatus 30 may promptly reflect the change of the automatic image capturing method executed in step S6 of FIG. 5, or may reflect the change by detecting and determining an appropriate timing. For example, the automatic image capturing method may be changed at a timing when movement of the former image capturing target object of the manual image capturing camera 10 is stopped, at a timing when the object is making a movement of a low degree of importance, or at a timing when the flow of a game is stopped in a case where a scene of a soccer game is being captured.

Further, in the above-described exemplary embodiment, the description is given of a case where the change-of-object detection unit 138 detects the change of an object from the object captured by a camera 10 during automatic image capturing after the image capturing operation of the camera 10 is switched from automatic image capturing to manual image capturing. However, with respect to a camera 10 on which a specific setting operation, such as image quality adjustment or change of camera settings, is being executed, a captured image is considered as an invalid video image. Thus, the object automatically captured by the foregoing camera 10 may also be followed by another automatic image capturing camera 10.

In this case, the change-of-object detection unit 138 acquires information about a setting operation that the user performs on the camera 10 from the multi-camera control apparatus 40. Then, from among the plurality of cameras 10, the change-of-object detection unit 139 may detect a camera 10 on which the setting operation is being performed as a camera of which the automatic image capturing function is disabled and of which the object is changed from the object captured during automatic image capturing. A camera 10 having malfunctions of some sort or a camera 10 of which the power is turned off may also be treated in a same way.

In other words, the change-of-object detection unit 138 may also detect a camera 10 on which the above-described setting operation is being executed, a camera 10 having malfunctions, or a camera 10 of which the power is turned off as a camera of which the automatic image capturing function is disabled and of which the object is changed from the object captured during automatic image capturing. Then, based on a detection result received from the change-of-object detection unit 138, the automatic image capturing method determination unit 132 may determine the automatic image capturing method to cause another automatic image capturing camera 10 to capture the object captured by the above-described camera 10 during automatic image capturing.

In addition, in the processing for changing the automatic image capturing method according to the above-described exemplary embodiment, in a case where the object is changed to another object due to switching to a manual image capturing operation, the automatic image capturing instruction apparatus 30 determines only one camera of which the automatic image capturing method is to be changed. However, the number of cameras of which the automatic image capturing methods are to be changed is not limited to one, and automatic image capturing methods of two or more automatic image capturing cameras may be changed. Change of objects of the manual image capturing camera and the automatic image capturing camera executed in the above-described case will be described with reference to FIG. 7.

Figure 7:
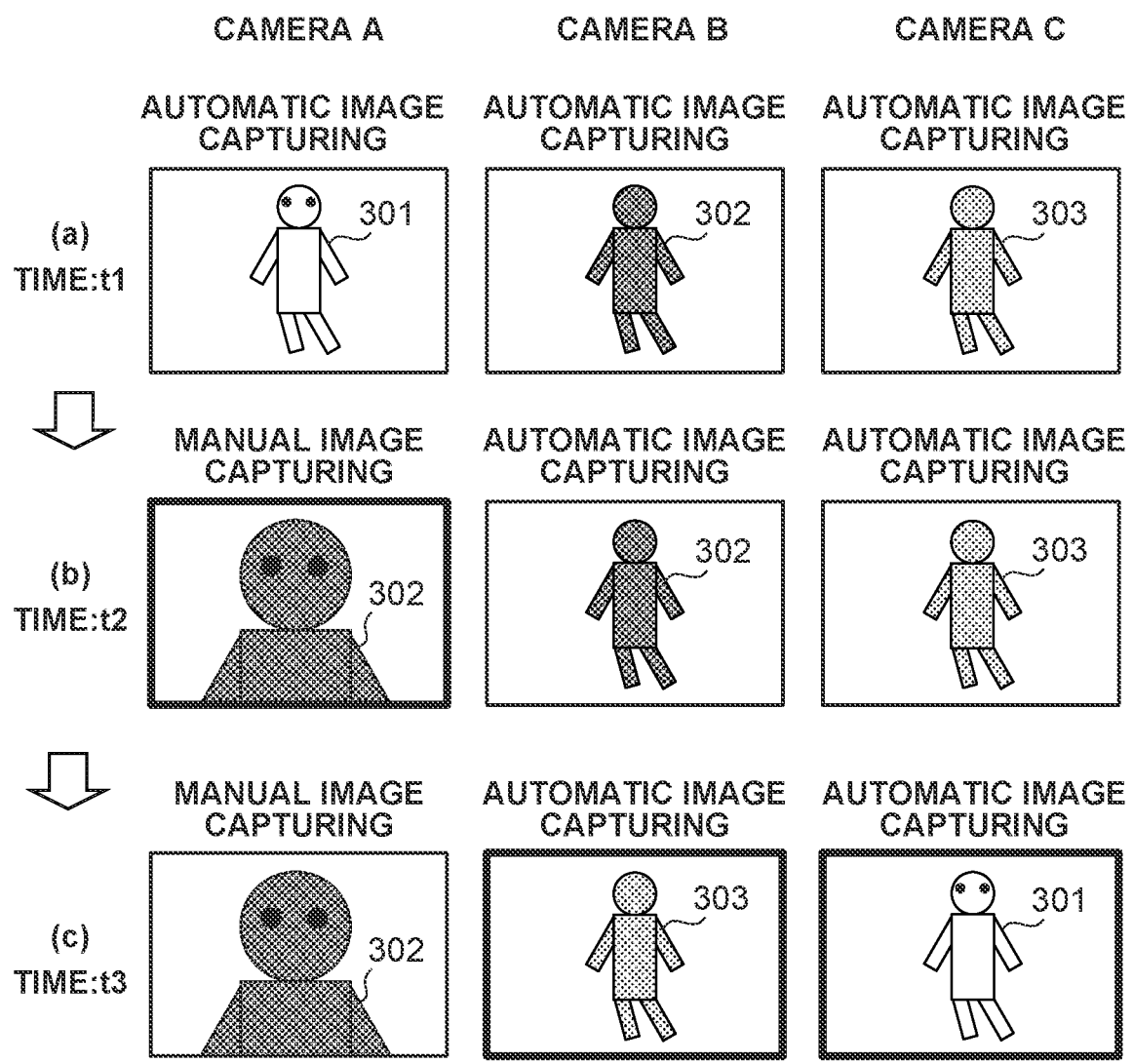
FIG. 7 shows diagrams illustrating another example of change of objects captured by cameras.

The states at time t1 and time t2 illustrated in (a) and (b) in FIG. 7 are similar to the states at time t1 and time t2 illustrated in (a) and (b) in FIG. 6. In other words, (a) and (b) in FIG. 7 illustrate the states where the user selects a camera A as a manual image capturing camera and the object of the camera A is changed to a person 302 from a person 301.

For example, it is assumed that the automatic image capturing policy managed by the automatic image capturing policy management unit 134 is not only to capture as many objects as possible, but also to capture an object's facial expression from a front side thereof without placing a limitation on the number of cameras of which the image capturing methods are to be changed if that object is an object of a high degree of importance.

In this case, whether or not the face can be captured from the front side may depend on a combination of the arrangement of the camera 10 and the orientation of the object.

For example, it is assumed that the face of the person 301 regarded as an object of a high degree of importance cannot be captured from the front side by the camera B but can be captured by the camera C. In this case, in step S5 in FIG. 5, the automatic image capturing method determination unit 132 determines the camera C as an automatic image capturing camera for capturing the person 301. Further, the automatic image capturing method determination unit 132 determines the camera B as an automatic image capturing camera for capturing the person 303, i.e., an object formerly captured by the camera C.

When the automatic image capturing methods of the camera B and the camera C are changed in step S6 in FIG. 5, as illustrated in (c) in FIG. 7, at time t3, an object of the camera B is changed to the person 303, and an object of the camera C is changed to the person 301.

As described above, in a case where an object is changed to another object due to switching to a manual image capturing operation, the automatic image capturing methods of two or more automatic image capturing cameras may be changed. In this way, an object changed by switching of the image capturing operation to a manual image capturing operation can not only be followed by the automatic image capturing cameras, but also be captured in a desired orientation.

In addition, in (a)-(c) in FIG. 6 and in (a)-(c) in FIG. 7, for the sake of simplicity, changes of the objects of three cameras in the image capturing system has been described. However, the number of cameras is not limited thereto. Further, in a case where image capturing methods of two or more cameras are to be changed, an upper limit value may be set with respect to the number of cameras of which the image capturing methods are changed. Furthermore, an optimum automatic image capturing method may newly be determined with respect to all of the automatic image capturing cameras excluding the manual image capturing camera.

Other Exemplary Embodiments

Some embodiments can be realized by the processing in which a program for realizing one or more functions of the above-described exemplary embodiments is supplied to a system or an apparatus via a network or a storage medium, and one or more processors in the system or the apparatus read and execute the program. Further, some embodiments can also be realized with a circuit (e.g., application specific integrated circuit (ASIC)) that executes the one or more functions.

According to the above-described exemplary embodiments, it is possible to execute efficient and effective image capturing in the entire image capturing system in which both of a manual image capturing camera and an automatic image capturing camera exist.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-195614, which was filed on Dec. 1, 2021 and which is hereby incorporated by reference herein in its entirety.

What is claimed is:

1. An information processing apparatus comprising a computer executing instructions which, when executed by the computer, cause the information processing apparatus to:
   detect, from among a plurality of image capturing apparatuses, a first image capturing apparatus a state of which is changed from (a) automatic image capturing in which the first image capturing apparatus automatically tracks and captures a first object by PTZ control to (b) manual image capturing in which the first image capturing apparatus captures a second object different from the first object based on an instruction from a user; and
   cause a second image capturing apparatus from among the image capturing apparatuses other than the first image capturing apparatus to perform the automatic image capturing in which the second image capturing apparatus automatically tracks and captures the first object, in a case where the first image capturing apparatus is detected.

2. The information processing apparatus according to claim 1, wherein the instructions, when executed by the computer, cause the information processing apparatus to determine the second image capturing apparatus based on positional information of each of the plurality of image capturing apparatuses.

3. The information processing apparatus according to claim 1, wherein the instructions, when executed by the computer, cause the information processing apparatus to determine, from among the image capturing apparatuses in which a function of the automatic image capturing is enabled and which are other than the first image capturing apparatus, an image capturing apparatus that is capturing the second object as the second image capturing apparatus.

4. The information processing apparatus according to claim 1, wherein the instructions, when executed by the computer, cause the information processing apparatus to determine, from among the image capturing apparatuses in which a function of the automatic image capturing is enabled and which are other than the first image capturing apparatus, an image capturing apparatus that is capturing an object positioned closest to the first object as the second image capturing apparatus.

5. The information processing apparatus according to claim 1, wherein the instructions, when executed by the computer, cause the information processing apparatus to determine, from among the image capturing apparatuses in which a function of the automatic image capturing is enabled and which are other than the first image capturing apparatus, any one of image capturing apparatuses which are capturing an identical object as the second image capturing apparatus.

6. The information processing apparatus according to claim 1, wherein the instructions, when executed by the computer, cause the information processing apparatus to determine, from among the image capturing apparatuses in which a function of the automatic image capturing is enabled and which are other than the first image capturing apparatus, an image capturing apparatus arranged at a position closest to the first image capturing apparatus as the second image capturing apparatus.

7. The information processing apparatus according to claim 1, wherein the instructions, when executed by the computer, cause the information processing apparatus to determine, from among the image capturing apparatuses in which a function of the automatic image capturing is enabled and which are other than the first image capturing apparatus, an image capturing apparatus that is capturing an object with a lowest degree of importance as the second image capturing apparatus.

8. The information processing apparatus according to claim 1, wherein the instructions, when executed by the computer, cause the information processing apparatus to determine at least one of the image capturing apparatuses in which a function of the automatic image capturing is disabled and which are other than the first image capturing apparatus as the second image capturing apparatus.

9. An information processing method comprising:
   detecting, from among a plurality of image capturing apparatuses, a first image capturing apparatus a state of which is changed from (a) automatic image capturing in which the first image capturing apparatus automatically tracks and captures a first object by PTZ control to (b) manual image capturing in which the first image capturing apparatus captures a second object different from the first object based on an instruction from a user; and
   causing a second image capturing apparatus from among the image capturing apparatuses other than the first image capturing apparatus to perform the automatic image capturing in which the second image capturing apparatus automatically tracks and captures the first object, in a case where the first image capturing apparatus is detected.

10. A non-transitory computer readable storage medium storing a computer-executable program for causing a computer to perform an information processing method, the information processing method comprising:
   detecting, from among a plurality of image capturing apparatuses, a first image capturing apparatus a state of which is changed from (a) automatic image capturing in which the first image capturing apparatus automatically tracks and captures a first object by PTZ control to (b) manual image capturing in which the first image capturing apparatus captures a second object different from the first object based on an instruction from a user; and causing a second image capturing apparatus from among the image capturing apparatuses other than the first image capturing apparatus to perform the automatic image capturing in which the second image capturing apparatus automatically tracks and captures the first object, in a case where the first image capturing apparatus is detected.

\* \* \* \* \*